Nov. 29, 1938.  E. R. TROYER  2,138,561
ANIMAL POKE
Filed Nov. 13, 1935  2 Sheets-Sheet 1
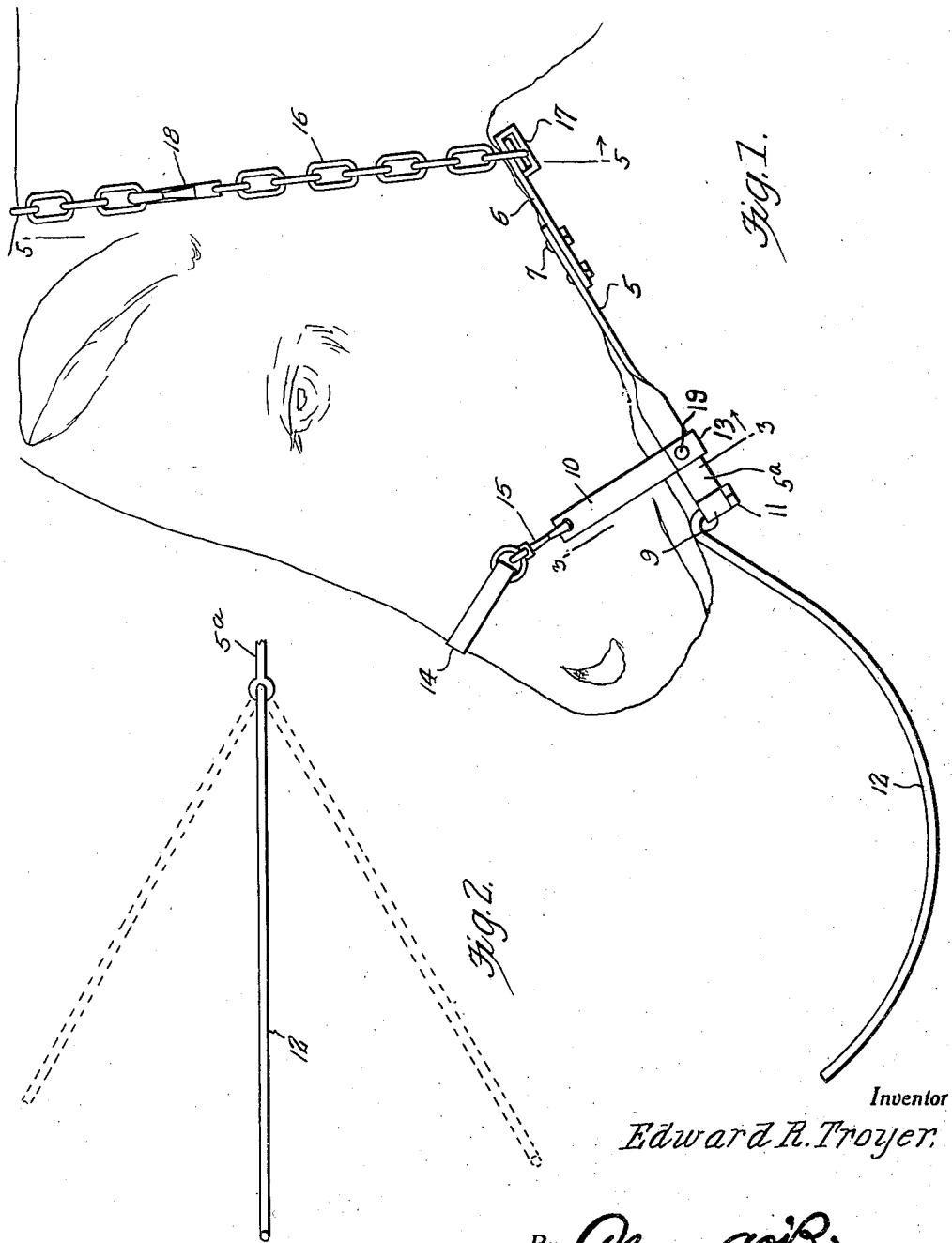
Inventor
Edward R. Troyer
By Clarence A. O'Brien
Attorney Nov. 29, 1938. E. R. TROYER 2,138,561
ANIMAL POKE
Filed Nov. 13, 1935 2 Sheets-Sheet 2

Inventor
Edward R. Troyer,

By Clarence A. O'Brien
Attorney

Patented Nov. 29, 1938

2,138,561

UNITED STATES PATENT OFFICE 2,138,561

ANIMAL POKE

Edward R. Troyer, Goshen, Ind.

Application November 13, 1935, Serial No. 49,559

1 Claim. (Cl. 119—141)

The present invention relates to an animal poke designed particularly to use on cows and like cattle and has for its object to provide means to efficiently prevent such cattle from going through fences and the like obstructions.

A specific object of the invention resides in the provision of a poke of this nature which is adjustable to different size cattle, and is easy and convenient to mount on the cattle to remove therefrom.

A further important object of the invention resides in the provision of a poke of this nature which is simple in its construction, inexpensive to manufacture, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:—

Figure 1 is a side elevation of the device embodying the features of my invention.

Figure 2 is a fragmentary top plan view thereof.

Figure 5:
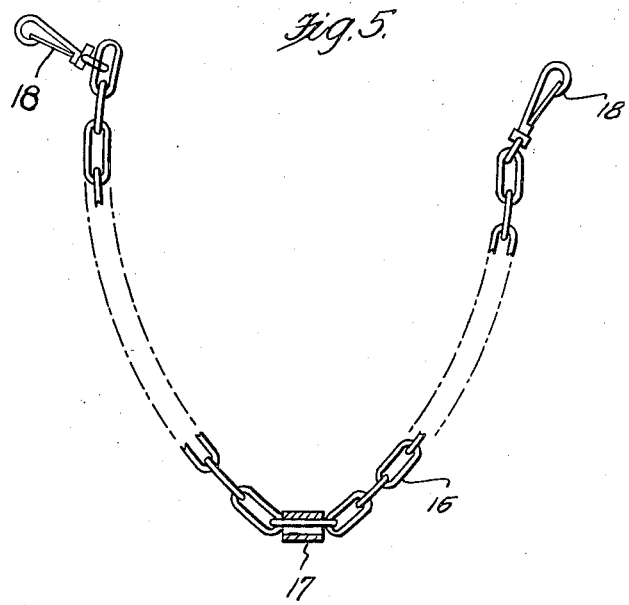
Figure 5 is a detail sectional view taken substantially on the line 5—5 of Figure 1.
Figure 4:
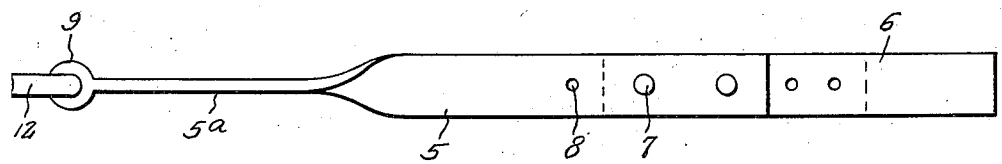
Figure 4 is a plan view of the bar members.
Figure 3:
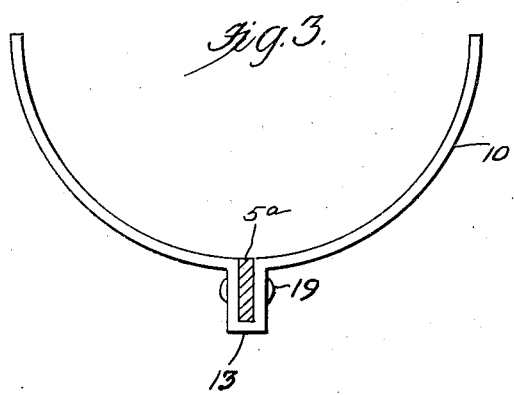
Figure 3 is a detail section taken substantially on the line 3—3 of Figure 1.

Referring to the drawings in detail it will be seen that I provide a bar formed in sections 5 and 6 adjustably connected together by bolts 7 extending through selected apertures 8 in the bar sections, the bar section 5 is twisted at right angles and terminates in a sleeve or eye 9 in which is pivotally secured by a nut 11 a terminal of a curved hook bar 12 of arcuate construction adapted to extend forwardly of the animal, as clearly shown in Figure 2. Portion 5a of section 5 has secured thereto a pair of arcuate members 10 connected to a substantially U-shaped center portion 13 riveted or otherwise secured as at 19 to the portion 5a. A strap 14 extends over the nose portion of the animal and has detachable connections 15 with the ends of the members 10.

A chain 16 extends over the neck of the animal and through the rectangular loop 17 formed at the end of the member 6 and the chain includes snap fasteners 18.

When the device is in use it is harnessed about the animal's head through the medium of the strap 14 and chain 16 as shown to advantage in Figure 1. The curved hook bar 12 is pivotally mounted in the eye 9 and is suspended therefrom when the animal directs its head downwardly, as when attempting to pass through a fence. The curved bar 12 when in this position will engage one or more strands of a fence and prevent the attempted escape of the animal. The device will not prevent grazing by the animal because the curved hook bar 12 may easily be swung to one side and clear the animal's mouth by movement of the animal's head.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

What is claimed is:—

A device of the class described comprising a bar formed in adjustably connected sections, the forward end of one of the sections being twisted and terminating in an eye transverse to said bar and its axis in a vertical plane, a poke of arcuate construction having an eccentric terminal extended through the eye to permit pivotal movement of the poke from side to side, arcuate members extending from each side of the twisted part of the forward member, a strap extending over the nose of the animal and having fastening means for engaging the arcuate members, an oblong loop formed in the rear portion of the bar, and a chain adapted to be disposed over the neck portion of the animal and through the oblong loop.

EDWARD R. TROYER.